United States Patent [19]

Honaker, Jr.

[11] Patent Number: 4,700,084
[45] Date of Patent: Oct. 13, 1987

[54] DIGITAL CLOCK RECOVERY CIRCUIT APPARATUS

[75] Inventor: Charles M. Honaker, Jr., Garland, Tex.

[73] Assignee: Rockwell International Corporation, El Segundo, Calif.

[21] Appl. No.: 769,218

[22] Filed: Aug. 26, 1985

[51] Int. Cl.4 .................... H03K 3/017; H03K 1/17
[52] U.S. Cl. .................... 307/269; 307/479; 307/262; 307/511; 307/518; 307/527; 328/63; 328/72; 328/109
[58] Field of Search ............ 328/63, 72, 109, 133; 307/479, 480, 527, 528, 511, 518, 269, 262

[56] References Cited

U.S. PATENT DOCUMENTS

| 3,755,748 | 8/1973 | Carlow et al. | 328/155 |
| 3,894,246 | 7/1975 | Torgrim | 307/208 |
| 4,025,866 | 5/1977 | Fletcher et al. | 328/38 |
| 4,641,044 | 2/1987 | Shiraishi | 307/269 |

Primary Examiner—Stanley D. Miller
Assistant Examiner—Richard Roseen
Attorney, Agent, or Firm—Bruce C. Lutz; V. L. Sewell; H. Fredrick Hamann

[57] ABSTRACT

A circuit for using a high speed clock and a counter to obtain a recovered clock with incoming data resetting the counter whenever a logic "1" of more than a predetermined number of high speed clocks is received. Further, the presence of a data out logic "1" inhibits the reaction of the circuit to any further input pulses during the time necessary to generate the retimed data output logic "1".

4 Claims, 4 Drawing Figures

DIGITAL CLOCK RECOVERY CIRCUIT APPARATUS

THE INVENTION

The present invention is concerned generally with electronics and, more specifically, with a circuit for recovering a clock signal from the signal amplitude excursions of a data signal from a logic "0" to a logic "1" or vice versa. Even more specifically, the present invention is concerned with a circuit for using digital electronics to accomplish clock signal recovery, wherein the clock is maintained over a long period of time of receipt of logic "0's" and is merely readjusted in phase upon further occurences of receipt of logic "1" signals.

BACKGROUND

Clock recovery circuits have been used for years using a ringing tank circuit wherein the occurence of a change in signal amplitude from a logic "1" to a logic "0" or vice versa has imparted energy into a inductive capacitive circuit and produced a ringing effect at the output of this circuit. These analog ringing tank circuits are notorious for needing adjustment, for changing characteristics with age of components, etc. Further, the ringing tank circuit has an output signal, which by definition, slowly decays over a period of time and if only a single logic value is received over a long period of time, energy is not added to the circuit to replace that dissipated. Thus, the oscillator circuit which is receiving its timing information from the ringing tank circuit, quickly falls out of synchronization with the incoming data and, upon the next receipt of a logic "1", the circuit timing is often so far off that complete circuit signal resynchronization has to take place.

The present invention on the other hand uses digital circuitry to divide or count a very stable and high speed clock to produce a lower speed "recovered clock" which is as stable as the initial clock. The phase of this recovered clock is adjusted by adjusting a dividing or counting circuit whenever a "valid" logic level excursion is detected. By eliminating action in response to logic level excursions of less than a predetermined time and by preventing phase adjustment during an entire period equivalent to a given data signal, the circuit can substantially eliminate any false phase adjustments due to signal transients, etc.

It is thus an object of the present invention to provide an improved clock recovery circuit.

Other objects and advantages of the invention may be ascertained from a reading of the specification and appended claims in conjunction with the drawings, wherein:

DETAILED DESCRIPTION

Figure 1:
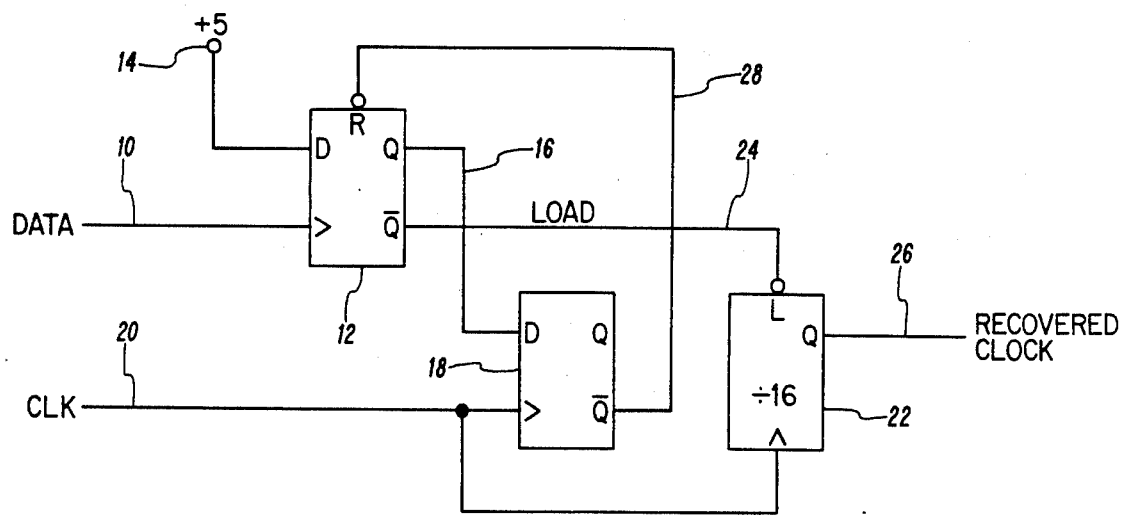
FIG. 1 is a block diagram of the basic inventive concept.

In FIG. 1, data is supplied on a lead 10 to a clock input of a D flip-flop 12. The D input is tied permanently to a logic "1" or a positive power source 14. A Q output of flip-flop 12 is supplied on a lead 16 to a D input of a second D flip-flop 18 having its clock input connected to a high frequency clock signal input lead 20. In one embodiment of the invention, this clock input was 16 times the frequency of the data signal. The clock input 20 is also connected to a clock input of a divide-by-16 counter 22. Counter 22 receives a load input from the $\overline{Q}$ output of flip-flop 12 on a lead 24. The divide-by-16 counter 22 has an output terminal which is connected to a recovered clock output lead 26. The $\overline{Q}$ output of flip-flop 18 is connected via a lead 28 to a reset input of flip-flop 12.

Figure 2:
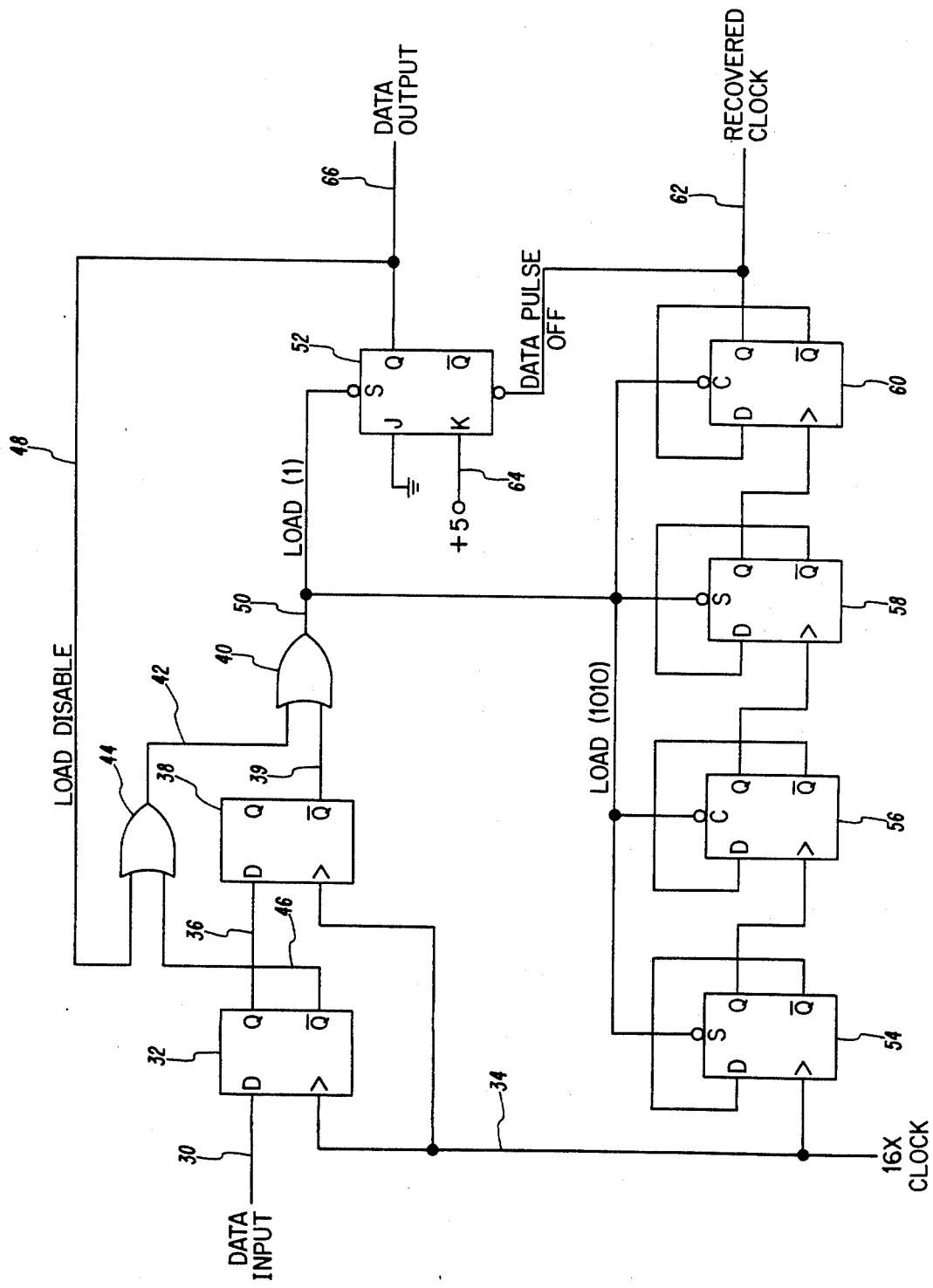
FIG. 2 is a schematic diagram of a single data input version of the inventive concept incorporating a feature which eliminates transient pulses from phase adjusting the recovered clock.

In FIG. 2, data is input on a lead 30 to a D input of a D flip-flop 32, having a clock input connected to a lead 34, which receives clock signals at a much higher frequency than the maximum data rate of data supplied on lead 30. A Q output of D flip-flop 32 is connected via a lead 36 to a D input of a second D flip-flop 38. The clock input of flip-flop 38 is also connected to lead 34. A Q output of flip-flop 38 is connected via a lead 39 to one input of a OR gate 40, which has its second input connected via a lead 42 to an output of an OR gate 44. One input of OR gate 44 is connected via a lead 46 to a $\overline{Q}$ output of D flip-flop 32. A second input of OR gate 44 is connected to a load DISABLE lead 48. An output of OR gate 40 is connected via a lead 50 to a SET input of a JK flip-flop 52, as well as being connected to various SET and CLR (clear) inputs of a set of D flip-flops designated as 54, 56, 58 and 60. As is known to those skilled in the art, the application of a logic "1" to the SET input of a D flip-flop sets its output to a logic "1" state, while supplying the same signal to the CLR input of the D flip-flop sets its output to a logic "0" state. The D flip-flops 54 through 60 are configured into a divide-by-16 logic circuit, and the application of the logic "1" to the various SET and CLR inputs of these flip-flops effectively loads a logic signal equivalent to (1010). The clock signal supplied on lead 34 is supplied to the clock input of D flip-flop 54. Each of the flip-flops 54 through 60 have its $\overline{Q}$ output supplied to its D input. Further, each of the flip-flops 54 through 58 has its Q output connected to the clock input of the following D flip-flop in the counter circuit. The final D flip-flop 60 has its Q output connected to an apparatus terminal 62 which supplies recovered clock signals to a further load. Lead 62 is also connected to a clock input of JK flip-flop 52. The J input of JK flip-flop 52 is connected to ground, while a K input thereof is connected to a positive potential 64. A Q output of JK flip-flop 52 is connected to provide data output signals for the circuit to a terminal 66, which is directly connected to the load DISABLE lead 48.

Figure 3:
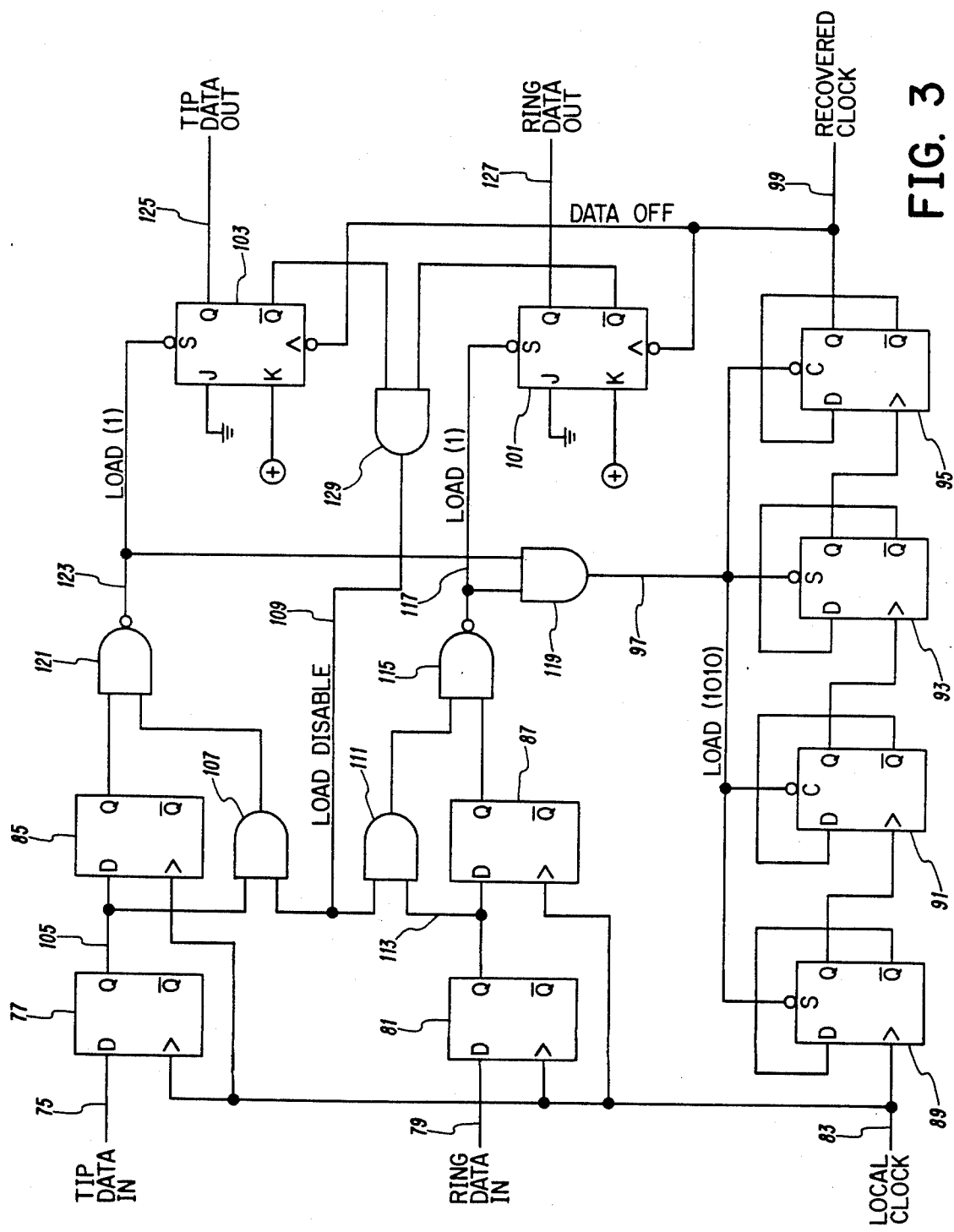
FIG. 3 is a circuit diagram of an embodiment of the invention wherein separate data lines are used to provide tip signals and ring signals to the recovered clock circuit.

In FIG. 3, data is input on a lead 75 to a D flip-flop 77. This data is labeled TIP data. Data (RING data) is also input on a lead 79 to a D flip-flop 81. The TIP and RING data is obtained from a signal format known to those skilled in the art as AMI (alternate mark inversion). A high speed local clock is provided on a lead 83 to the clock inputs of D flip-flops 77 and 81, as well as to D flip-flops 85, 87 and 89. D flip-flop 89 in combination with flip-flops 91, 93 and 95 provide a divide-by-16 counter in exactly the same fashion as outlined in FIG. 2. A lead 97 is connected to the SET and CLR inputs, as illustrated, and a lead 99 provides recovered clock signals to an output terminal of the circuit, as well as providing RESET signals back to a pair of JK flip-flops 101 and 103. A Q output of D flip-flop 77 is connected via a lead 105 to a D input of flip-flop 85, as well as to one input of an AND gate 107. A second input of AND gate 107 is connected to a lead 109 which is additionally labeled LOAD DISABLE. Lead 109 is also connected to an input of an AND gate 111. A second input of AND gate 111 is supplied on a lead 113 which also connects to a Q output of D flip-flop 81 and a D input of flip-flop 87. A Q output of flip-flop 87 is connected to an input of a NAND gate 115, which receives its other input from AND gate 111. An output of NAND gate 115 provides signals to a SET input of JK flip-flop 101 on a lead 117 as well as to one input of an AND gate 119. A NAND gate 121 receives input signals from a Q output of D flip-flop 85, as well as from an output of AND gate 107. An output of NAND gate 121 is supplied on a lead 123 to a SET input of JK flip-flop 103, as well as to a second input of AND gate 119. J inputs of flip-flops 103 and 101 are both connected to ground, while the K inputs of each of these flip-flops is connected to a positive power source. A Q output of JK flip-flop 103 is connected via a lead 125 to a TIP signal data output, while a Q output of JK flip-flop 101 is connected via a lead 127 to a RING data output. The $\overline{Q}$ outputs of JK flip-flops 103 and 101 are connected to inputs of an AND gate 129, which has its output connected to load DISABLE lead 109.

While D flip-flops have been used to illustrate the divide-by-16 operation, it will be realized that circuits can be purchased as a single chip to provide this operation in a manner similar to that shown in FIG. 1.

Figure 4:
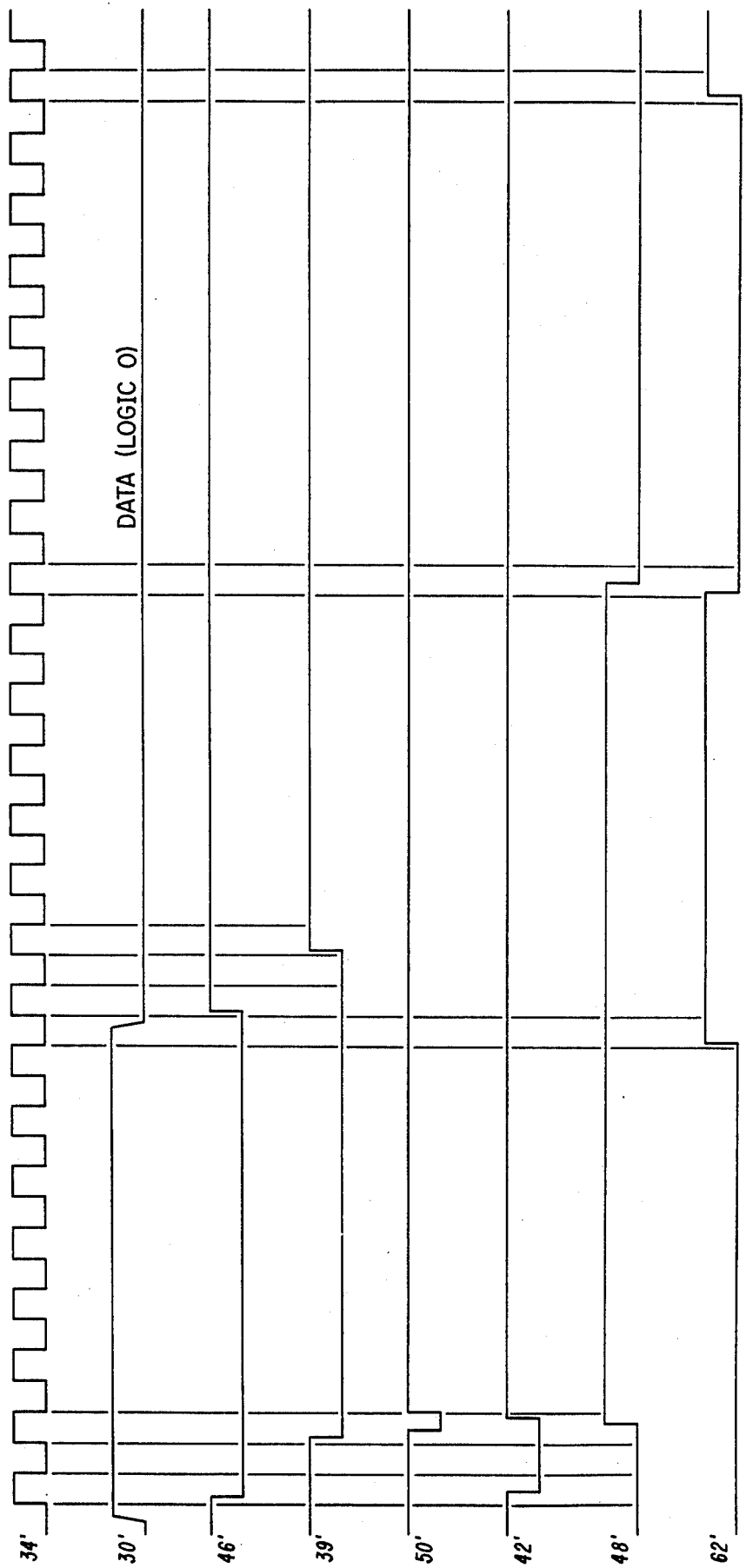
FIG. 4 is a set of waveforms for use in explaining the operation of the circuit of FIG. 2.

FIG. 4 comprises a set of waveforms with each waveform labeled by a number including a prime corresponding to a similarly numbered lead in FIG. 2. In other words, the high speed clock signal found on lead 34 of FIG. 2 is illustrated and labeled 34' in FIG. 4. The similar labeling is provided for signals found on leads 30, 46, 39, 50, 42, 48 and the recovered output clock signal of lead 62 in FIG. 1 are found in separate waveforms of FIG. 4. It will be further noted that the signal represented as waveform 30' has a high logic value which occurs over a period of eight clock pulses of the clock 34'. This is arbitrarily designated as a logic "1" signal. The time of occurrence of the next data pulse is labeled as data (logic "0") on this same waveform, merely to indicate the time of occurrence of this logic value. However, since the circuit only responds to logic "1" signals, to alter the time of occurrence of the recovered clock, there is no action taken by the circuit during the time of occurrence of logic "0" value signals.

OPERATION

Referring first to FIG. 1, it can be seen that as long as a clock signal is applied on lead 20 to the counter 22, a recovered clock will be output on lead 26, which is 1/16 the frequency of the input, since divider 22 divides the input clock by 16. Whenever a data pulse, similar to that of 30' in FIG. 4 and of a logic "1" value, is applied to D flip-flop 12, an output is applied to the divider 22 to cause it to readjust its count and thereby adjust the time of occurrence of the logic "1" portion of the output recovered clock. Reference to FIG. 4 will show that the load pulse 50' shown there is similar to that occurring on lead 24. The recovered clock 62' is supposed to change to a logic "1" value approximately half-way through the data pulse. Thus, by resetting the counter to a predetermined count whenever a data pulse is detected, the counter will output a signal which changes to a logic "1" at a given number of input clock pulses later. Typically, the recovered clock signal would be taken from the most significant bit of the counter, and thus this bit would be a logic "1" half the time and a logic "0" half the time. The feedback from D flip-flop 18 to flip-flop 12 causes this combination to act as a "one-shot circuit", regardless of the length of the input data pulse.

FIG. 1, as will be discerned by those skilled in the art, does not distinguish between long and short pulses and thus would be triggered by transient pulse, much shorter than a actual data pulse. Thus, the circuit of FIG. 2 was generated.

In FIG. 2, a data pulse signal such as that shown in 30' of FIG. 4, is applied to D flip-flop 32. At the occurrence of the next rising amplitude clock pulse of waveform 34', the output signal shown as 46' occurs after a propagation delay through the D flip-flop 32. A further propagation delay through OR gate 44 causes the output signal shown as 42' to be applied to OR gate 40. On the occurrence of the next rising amplitude clock, the D flip-flop 38 provides a falling output shown as 39', if in fact the data pulse is still a logic "1" on lead 30. If the lead 30 is not at a logic "1", the circuit reverts to its initial conditions on the next clock and awaits a further possible data pulse. However, if the logic level of lead 30 is still a logic "1" at the next clock, an output shown as 39' occurs, which in combination with a signal on lead 42, provides a load pulse output from OR gate 40, shown as waveform 50'. This pulse loads a given signal (phase adjusting signal) into the divide-by-16 counter comprising the D flip-flops 54 through 60, and sets the JK flip-flop 52 to provide the data output signal shown as 48'. A short time later the logic "1" level input to OR gate 44 causes the lead 42 to revert to a logic "1" level, thereby returning the lead 50 to a logic "1" level and thereby removing the logic "0" signals from the divider and the JK flip-flop 52. Since both leads of OR gate 44 must be at a logic "0" in order for a load pulse to appear on lead 50, the circuit will not react to any further inputs until termination of the time that the data output pulse is at a logic "1" level. Further, since the circuit does not react to any input data pulses which are less than two clock periods long, the circuit is very resistant to accidental actuation by transient pulses.

The operation of FIG. 3 is believed fairly evident from the description of operation of FIG. 2, but a brief explanation will be provided. Logic "1" signals are provided to the circuit comprising the D flip-flops 77 and 85 which operate in a manner substantially identical to that of FIG. 2. In other words, they restrict reaction of the circuit to a logic "1" input which lasts at least two clock periods. When a data pulse is detected lasting at least two clock periods, the JK flip-flop is set and the counter, comprising D flip-flops 89 through 95, is loaded with a given clock value to provide an adjustment (if necessary) of the phase of the output clock signal. The occurence of a data output pulse on lead 125 also causes a similar signal being output from JK flip-flop to the AND gate 129 to disable the circuit from accepting further data pulses on either leads 75 or 79 until termination of the TIP data output pulse from a logic "1" to a logic "0" value. At this time, a further signal such as a RING data signal can be input on lead 79 to actuate circuitry substantially identical to that for the TIP data signal. Again, if the RING data signal is longer than two clock periods of the clock appearing on lead 83, the NAND gate 115 will provide a load output pulse to load the divide-by-16 counter and to set the JK flip-flop 101. Again, the setting of flip-flip 101 will provide a load disable signal on lead 109 to restrict the circuit from reacting to further TIP or RING signals until termination of the RING data signal being maintained at a logic "1" level.

Although three embodiments of my inventive concept have been illustrated, I wish to be limited not by the embodiments illustrated, but only by the concept as claimed by the appended claims of a digital clock recovery circuit which actuates a counter upon detection of a valid input pulse and which phase adjusts the counter to the appropriate value relative the beginning of the data pulse as defined in the appended claims, wherein

I claim:

1. Digital signal clock recovery circuit apparatus comprising, in combination:

first means for supplying a digital input signal;

high frequency clock signal second means for supplying a clock signal that is much higher in frequency than the data rate of the digital signal supplied by said first means;

data detection third means, connected to said first means for receiving digital signals therefrom, connected to said second means for receiving clock signals therefrom, including detected pulse output means and detection disable input means, for providing an output signal at said output means thereof whenever a digital input signal of a first logic value is supplied by said first means while no signal is being received by said disable input means, and further including minimum signal input pulse width detection means whereby an output signal is provided to said detected pulse output means after the digital input signal from said second means is determined to have a duration of greater than one cycle of the high frequency clock signals;

data pulse generator fourth means, connected to said output means of said third means and including reset means and apparatus data output means, for commencing generation of a retimed output data signal upon receipt of a signal from said third means and terminating the retimed output data signal upon receipt of a signal at said reset means;

disable fifth means connected from said apparatus data output means of said fourth means to said disable input means of said third means; and clock signal dividing sixth means, having a clock input connected to said second means, a load input connected to said detected pulse output means of said third means and including recovered clock signal output means, for providing to said reset means of said fourth means a recovered clock output signal which is phase adjusted upon receipt of any signals received from said third means.

2. Apparatus as claimed in claim 1 wherein the pulse width detection third means comprises at least two flip-flop circuits and the time duration of the clock signal from said second means must exceed the time required to receive a plurality of high frequency clock pulses equal to the number of flip-flops in said detection third means before a detected pulse output signal is provided.

3. Apparatus as claimed in claim 1 wherein the clock signal dividing sixth means includes means for loading a predetermined count other upon receipt of a signal at said load input, the value of the count loaded affecting the relative time between the commencement of the retimed data output pulse and the commencement of the recovered clock signal.

4. Digital signal clock recovery circuit apparatus for use with separate data lines wherein a logic "1" signal appears on each of the data lines at different times comprising, in combination:

data line first means for supplying a first set of digital input signals;

high frequency clock signal second means for supplying a clock signal that is much higher in frequency than the data rate of the digital signal supplied by said first means;

data detection third means, connected to said first means for receiving digital signals therefrom, connected to said second means for receiving clock signals therefrom and including detected pulse output means and detection disable input means, for providing an output signal at said output means thereof whenever a digital input signal of a given logic value is supplied by said first means while no signal is being received by said disable input means;

data pulse generator fourth means, connected to said output means of said third means and including reset means and apparatus data output means, for commencing generation of a retimed output data signal upon receipt of a signal from said third means and terminating the retimed output data signal upon receipt of a signal at said reset means;

data line fifth means for supplying a second set of digital input signals;

data detection sixth means, connected to said fifth means for receiving digital signals therefrom, connected to said second means for receiving clock signals therefrom and including detected pulse output means and detection disable input means, for providing an output signal at said output means thereof whenever a digital input signal of a given logic value is supplied by said fifth means while no signal is being received by said disable input means;

data pulse generator seventh means, connected to said output means of said sixth means and including reset means and apparatus data output means, for commencing generation of a retimed output data signal upon receipt of a signal from said sixth means and terminating the retimed output data signal upon receipt of a signal at said reset means;

disable eighth means connected from said apparatus data output means of said fourth and seventh means to said disable input means of said third and sixth means; and clock signal dividing ninth means, having a clock input connected to said second means, a load input connected to said detected pulse output means of said third and sixth means and including recovered clock signal output means, for providing to said reset means of said fourth and seventh means a recovered clock output signal which is phase adjusted upon receipt of any signals from said third or sixth means.

* * * * *